United States Patent
Hendrick, Jr. et al.

(10) Patent No.: US 6,525,814 B1
(45) Date of Patent: *Feb. 25, 2003

(54) APPARATUS AND METHOD FOR PRODUCING A SPECTRALLY VARIABLE RADIATION SOURCE AND SYSTEMS INCLUDING SAME

(75) Inventors: Roy W. Hendrick, Jr., Goleta, CA (US); Matthew C. Thomas, Carpinteria, CA (US)

(73) Assignee: Mission Research Corporation, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,595

(22) Filed: Oct. 22, 1999

Related U.S. Application Data

(60) Provisional application No. 60/105,378, filed on Oct. 23, 1998.

(51) Int. Cl.[7] .................................................. G01J 3/28
(52) U.S. Cl. ..................... 356/328; 356/334; 356/332; 356/329; 359/305; 359/311; 359/985; 359/618
(58) Field of Search ................................. 356/319, 326, 356/325, 328, 329, 330, 334, 345, 194; 359/558, 305, 563, 311, 573, 985, 578, 583, 618; 250/495.1, 494.1, 208.2; 372/22

(56) References Cited

U.S. PATENT DOCUMENTS

| | | | |
|---|---|---|---|
| 3,600,093 A | * 8/1971 | McMahon | ................... 356/334 |
| 3,604,788 A | * 9/1971 | Plage et al. | ................... 356/325 |
| 3,641,350 A | * 2/1972 | Petropoulas et al. | ........ 356/124 |
| 3,775,620 A | * 11/1973 | Meier | ........................ 356/334 |
| 3,875,413 A | 4/1975 | Bridgham | |
| 3,968,370 A | 7/1976 | Luft | |
| 4,620,104 A | 10/1986 | Nordal et al. | |
| 4,652,761 A | * 3/1987 | Kerr et al. | ................... 356/328 |
| 4,996,437 A | 2/1991 | Hendrick, Jr. | |
| 5,136,164 A | 8/1992 | Hendrick, Jr. | |
| 5,214,292 A | 5/1993 | Hendrick, Jr. | |
| 5,369,277 A | 11/1994 | Knodle et al. | |
| 5,394,237 A | 2/1995 | Chang et al. | |
| 5,536,933 A | * 7/1996 | Izumi et al. | ............. 250/208.2 |
| 5,579,106 A | * 11/1996 | Kremer | ....................... 356/528 |
| 5,602,398 A | 2/1997 | Knodle et al. | |
| 5,680,209 A | 10/1997 | Machler | |
| 5,710,627 A | 1/1998 | Inoue et al. | |
| 5,715,055 A | 2/1998 | Nanko et al. | |
| 5,731,874 A | 3/1998 | Maluf | |
| 5,748,309 A | 5/1998 | van der Weide et al. | |
| 6,188,507 B1 | * 2/2001 | Thomas | ....................... 356/345 |
| 6,304,237 B1 | * 10/2001 | Karakawa | ..................... 372/22 |
| 6,316,777 B1 | * 11/2001 | Parrish et al. | ........... 250/495.1 |

\* cited by examiner

Primary Examiner—Frank G. Font
Assistant Examiner—Sang H. Nguyen
(74) Attorney, Agent, or Firm—Christie, Parker & Hale, LLP

(57) ABSTRACT

An apparatus and method for producing a spectrally variable radiation source and systems including same is disclosed. An embodiment of a spectrally variable radiation source is disclosed including a broadband radiation source, a collimating element, a dispersive element, an imaging element, an output aperture and an optional output collimating element. An embodiment of a spectrally encoded infrared chromatograph incorporating the inventive spatially variable radiation source is disclosed. An arbitrary spectrum projector for simulating emission or absorption spectra for chemical and biological agents, as well as projecting calibration and test spectra for characterizing sensors is also disclosed.

7 Claims, 3 Drawing Sheets

APPARATUS AND METHOD FOR PRODUCING A SPECTRALLY VARIABLE RADIATION SOURCE AND SYSTEMS INCLUDING SAME

CROSS-REFERENCE TO RELATED APPLICATION

This utility patent application claims benefit of Provisional Patent Application, Serial No. 60/105,378, titled APPARATUS AND METHOD FOR PRODUCING A SPECTRALLY VARIABLE RADIATION SOURCE AND SYSTEMS INCLUDING SAME, filed Oct. 23, 1998.

BACKGROUND OF THE INVENTION

1. Technical Field

This invention relates to the field of electromagnetic radiation sources. More particularly, this invention relates to point or line radiation sources with an arbitrarily variable spectrum and systems and methods employing same.

1. State of the Art

All objects of non-zero absolute temperature emit thermal radiation. Spectral energy density $f(\lambda, T)$ is given by Planck's radiation law:

$$f(\lambda, T) = \frac{8\pi hc\lambda^{-5}}{(e^{hc/\lambda kT} - 1)}, \quad (1)$$

which is strictly valid for a blackbody, where $h=6.626\times10^{-34}$ J S (Planck's constant), $c=2.998\times10^8$ m/s (speed of light), $\lambda$ is wavelength, $k=1.381\times10^{-23}$ J/K (Boltzman constant), and T is absolute temperature. For bodies at room temperature (T=300 K), this yields a spectrum with a maximum intensity at approximately 10 $\mu$m wavelength in the middle infrared spectral range. If the temperature is increased, the spectral energy distribution will vary according to equation (1), and the wavelength at maximum intensity ($\lambda_{max}$) will be displaced towards shorter wavelengths. For T=6000 K, the temperature of the surface of the sun, $\lambda_{max}$ is in the visible range. This displacement of $\lambda_{max}$ as a function of temperature is approximated by Wein's displacement law:

$$\lambda_{max} \cdot T = \text{constant} = 2.898\ 33\ 10^{-3} m \cdot s, \quad (2)$$

which can be derived from equation (1). By integration over all radiation frequencies, one derives Stefan-Boltzmann's radiation law:

$$R = \sigma T^4, \quad (3)$$

where the total emittance, R, is the total energy of all wavelengths emitted per unit time and per unit area of the blackbody, T is the kelvin temperature, and $\sigma$ is the Stefan-Boltzmann constant, equal to $5.672\times10^{-8}$ W/m$^2$K$^4$. It should be noted that the total emittance for an outside surface of an object is always somewhat less than R in equation (3), and is different for different materials. A good approximation of total emittance for non-blackbody objects is:

$$R = \epsilon \sigma T^4, \quad (4)$$

where $\epsilon < 1$, and is termed the object's emissivity.

Electromagnetic radiation sources are used in products ranging from lights to X-ray machines. For example in a conventional infrared spectrometer, one will typically find a hot radiation source, an optical filter that selects a restricted spectral region from the continuum of radiation emitted by the source, a chamber containing a sample which is radiated, and a detector that measures radiation passed through the sample. Usually, the radiation sources of such spectrometers operate at a constant temperature $T_h$, which is much higher than the background, or ambient, temperature, $T_0$.

For many practical instruments it is useful to modulate the emitted radiation either spectrally, temporally, or both. One conventional method of creating pulsed radiation is to insert a rotating wheel (a chopper) furnished with equidistant apertures along the rim, into the radiation path to make the radiation pulsed. Pulsed radiation is particularly useful because many types of infrared detectors only respond to changes in radiation level. For example, pyroelectric detectors used in applications of photoacoustic spectroscopy and related techniques, require pulsed radiation. Pulsed radiation is also advantageous in electronic amplification and noise discrimination.

A non-mechanical means of providing pulsed radiation is disclosed by Nordal et al. in U.S. Pat. No. 4,620,104. In Nordal et al., thick film resistors mounted on ceramic substrates are electrically heated with pulsed current to generate pulsed infrared radiation without the use of mechanically moving parts. However, Nordal et al. appears to be limited to producing infrared radiation because the resistors can only be heated to limited temperatures, i.e., T<800 K.

The Nordal et al. reference (U.S. Pat. No. 4,620,104) also discloses a spectrometer based on an infrared radiation source, but it is limited to the infrared spectral range because of the light source employed.

Thus, there is a need in the art for spectrally encoded radiation sources, not limited to infrared spectral radiation, and systems based on same.

SUMMARY OF THE INVENTION

The present invention includes an apparatus and method for producing a spectrally variable radiation source and systems including same. An embodiment of a spectrally variable radiation source is disclosed including: a broadband radiation source array, a collimating element, a dispersive element, an imaging element, an output aperture and an optional output collimating element.

An embodiment of a spectrally encoded infrared chromatograph incorporating a spectrally variable radiation source is disclosed. The embodiment of a spectrally encoded infrared chromatograph includes an infrared emitter array, a collimating element, a dispersive element, an imaging element, an output aperture, an output collimating element, a beam splitter, a measurement beam focusing element, a sample cell, a measurement signal detector, a reference focusing element, a reference signal detector, and a processor for processing and displaying sample spectra.

An arbitrary spectrum projector for simulating emission or absorption spectra for chemical and biological agents, as well as projecting calibration and test spectra for characterizing sensors, is also disclosed. An embodiment of a arbitrary spectrum projector includes an emitter array, a transmitting lens, a diffraction grating, a collimating lens, a focusing lens, an adjustable slit with a reflective back, a blackbody radiator, a mirror for reflecting blackbody radiation, and an output collimating lens.

BRIEF DESCRIPTION OF THE DRAWING FIGURES

In the drawings, which illustrate what is currently regarded as the best mode for carrying out the invention and in which like reference numerals refer to like parts in different views or embodiments:

DETAILED DESCRIPTION OF THE INVENTION

Figure 1:
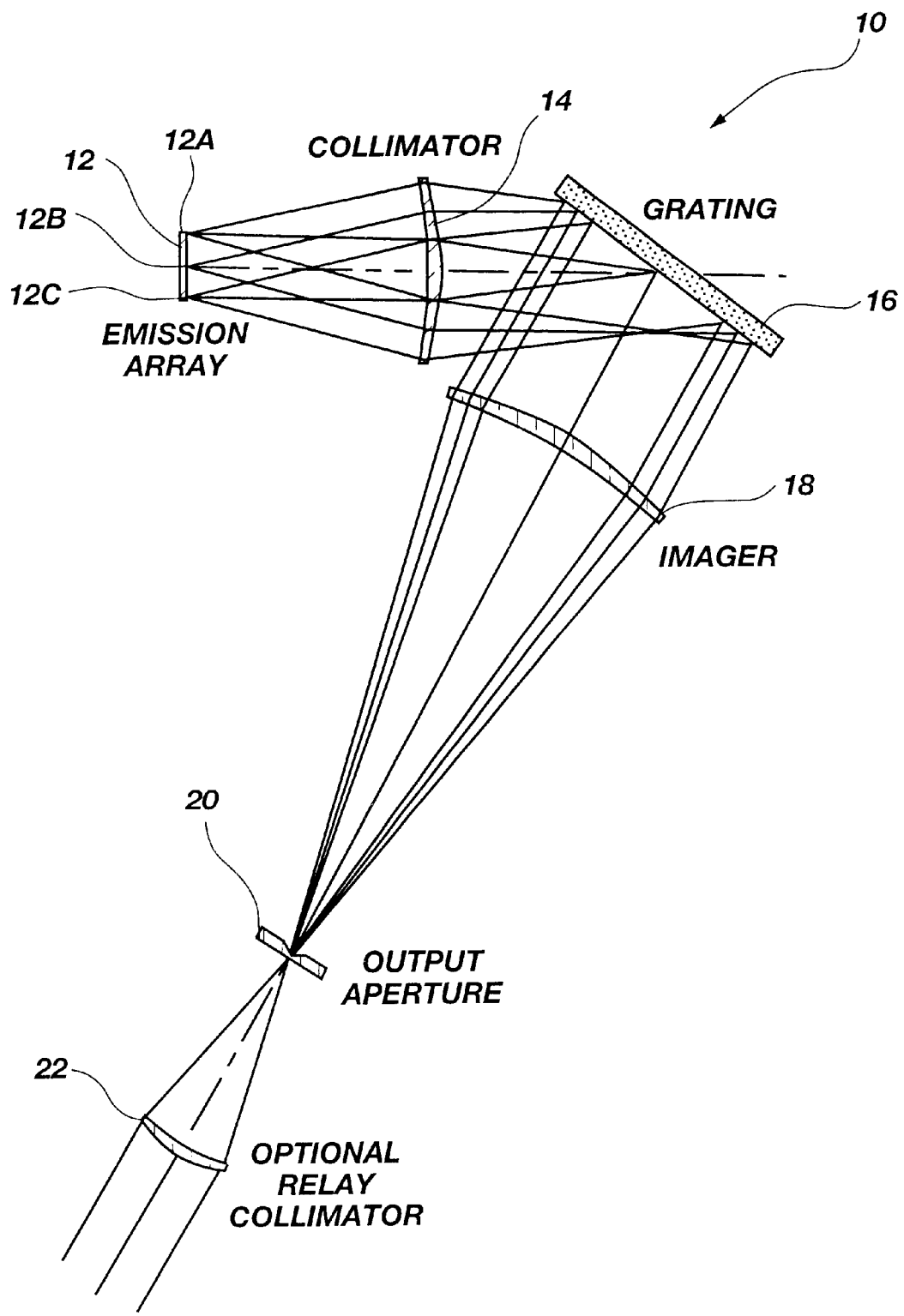
FIG. 1 is an embodiment of a spectrally variable radiation source in accordance with this invention.

The following detailed description discloses spatially variable radiation sources capable of producing dynamic, arbitrary spectral signatures, spectrally encoded chromatographs incorporating spatially variable radiation sources in accordance with this invention, and arbitrary spectrum projectors with spatially variable radiation emitters in accordance with this invention. Methods of producing spectrally variable radiation and uses for same are also described.

A spectrally variable radiation source in accordance with the invention may include a light source, a collimating element, a dispersive element, an imaging element, and an output aperture. Optionally, an output collimating element may be employed where collimated light is desired. Light emanating from the light source is collimated by the collimating element, producing a parallel beam of light. The collimating element may be a lens or a mirror. The collimated beam of light emerging from the collimating element is made incident on a dispersive element, which deflects the beam to an imaging element. The imaging element focuses the radiation from the dispersive element on an output aperture. The terms "output aperture", "exit aperture" and "exit slit" are used interchangeably hereinafter. Radiation which passes through the output aperture wil emerge as spectrally variable radiation depending on the light source employed in the invention. Where collimated spectrally variable radiation is desired, an optional output collimating element can be used to collimate the spectrally variable radiation emerging from the output aperture.

The light source may comprise an infrared emitter array, or a photon source coupled with a light modulator such as a digital micro-mirror device (DMD), a liquid crystal display (LCD), a cathode-ray-tube (CRT) addressed LCD, or a grating light valve (GLV). The photon source may be continuous-wave or pulsed broadband light source. The photon source may be a high-power visible lamp including, for example and not by way of limitation, a high-power xenon lamp, metal halide lamp, a divergent continuous-wave laser, a flash lamp, or even a divergent pulsed laser. The collimating element can be a mirror or lens. The photon source may be an infrared light source such as a hot blackbody which radiates electromagnetic energy over a relatively broad range of frequencies. A high temperature blackbody (T>400 K), has reasonable spectral emission from about 3–12 $\mu$m. Raising the temperature of a blackbody raises the power at all wavelengths in the spectral band emitted by the blackbody.

A preferred broadband infrared emitter array for use in this invention is the Nuclear Optical Dynamic Display System (NODDS), available commercially from Mission Research Corporation, Santa Barbara, Calif. The NODDS is a 512×512 array of dynamically driven, individually controlled microscopic resistors. By turning different emitter columns on or off with computer-controlled drive electronics, a time-varying spectrum is produced. There are other sources of infrared emitter arrays suitable for use in this invention, including without Inimtation: Honeywell Technology Center and British Aerospace.

A DMD is an array of microscopic mirrors (i.e., 17 micron pitch) that can be electronically positioned to either reflect incoming light to an output lens (or mirror) or to a beam stop. Where the light goes to a lens, it is collimated and sent to a grating for dispersion. Typical DMD array sizes are 800×600, so in the nominal application, the 800 mirrors will be in the wavelength selective direction. The intensity at each wavelength is controlled by the length of time the individual mirror is reflecting light towards the output lens and grating. This is known as pulse width modulation (PWM). Typical DMDs have switching times of 15 milliseconds, so a resolution of 10-bits (1024) can be used with a 60 Hz output frame rate (16.667 microseconds per frame.) DMDs are commercially available from a number of vendors.

A GLV uses micro-electromechanical systems technology and optical physics to vary how light is reflected from each of multiple ribbon-like structures that represent a particular "image point" or pixel. The ribbons can move a tiny distance, changing the direction of reflected light. Grayscale tones are achieved partly by varying the speed at which given pixels are switched on and off (PWM).

The imaging element may comprise a mirror or lens. As is commonly known in the art of optics, it is often possible to substitute a mirror for a lens and vice versa depending on the layout of the optical system. The dispersive element may be a prism, but is preferably a diffraction grating. The specific embodiment of a spectrally variable radiation source described below pertains to an infrared source, but the invention is not limited to the infrared frequency band, and is equally applicable to other spectral bands. The terms "frequency band" and "spectral band" will be used interchangeably hereinafter.

An Infrared Embodiment of a Spectraily Variable Radiation Source

Referring to FIG. 1, an infrared embodiment of a spectrally variable radiation source (SVRS) 10 is shown. The infrared embodiment of a spectrally variable radiation source uses a light source 12 comprising a resistively heated array of miniature emitters 12. An example of a large infrared emitter array suitable for use as a light source 12 in this infrared embodiment of a spectrally variable radiation source 10 is the aforementioned NODDS. The currently preferred NODDS emitter array is 512×512. The number of required emitters in the cross-spectral direction is driven by the field of view (FOV) of the spectrometer (UUT). If the FOV is small, for instance, then only a few emitter rows are required. In this case, a 512×16 array, for instance, would be sufficient. However, larger arrays with more elements in the "along spectral" direction (row or column) may provide better resolution or wider bandwidth when used in a spectrum projector, see below. The terms "linear array of broad band infrared emitters", "array of miniature emitters", "infrared emitter array", and "emitter array" are used synonymously in this detailed description. In the illustrated embodiment of FIG. 1, there are three exemplary individual emitters shown (12A, 12B, and 12C). Other heating methods may be used. Each emitter (12A, 12B, and 12C) radiates in a broad spectra band and is electronically controllable at rates of up to hundreds of frames per second. The intensity of each emitter (12A, 12B, and 12C) in the array may be individually controlled. Each emitter (12A, 12B, and 12C)

contributes to the output spectrally variable source radiation in a particular spectral increment as determined by the dispersive element (diffraction grating 16).

The radiation from the emitter array is collimated by a lens 14 (collimator) so that the radiation from a particular emitter (12A–C) is transformed into a collimated beam. The angle of beam propagation is uniquely dependent upon the location of the emitter (12A, 12B, and 12C) in the array. The collimated beam is made incident on a diffraction grating 16 which deflects the beam to an output lens 18 (imager). The output lens 18 forms a dispersed image of the radiation on an output aperture 20.

Only radiation incident on the output lens in a narrow cone will exit through the output aperture 20. The angle between an input beam and this unique output beam is called the dispersive deflection and will be different for each emitter (12A, 12B, and 12C) in the emitter array 12.

The dispersive properties of the grating 16 are such that a particular dispersive deflection is achieved only for a particular wavelength of radiation. Thus, for the radiation passing through the output aperture 20, there is a unique, one-to-one relationship between a source emitter (12A, 12B, and 12C), that determines the incidence angle on the grating 16, and a transmitted wavelength. This assumes that the grating 16 is always working in a single diffraction order. Varying the brightness of an emitter (12A, 12B, and 12C) varies the brightness of the corresponding spectral component in the output beam.

The relationship between the location of an emitter (12A, 12B, and 12C) and the corresponding output wavelength can be computed and/or calibrated with a standard spectrograph (not shown).

In summary, the infrared embodiment of the spectrally variable radiation source transforms a spatial variation of brightness from a broadband, extended emitter into a spectral variation from a small source. Variations on this infrared embodiment may include using a two-dimensional array of heated elements and replacing the exit aperture with a slit parallel to the grating grooves. This approach results in a line of sources, each of which has independently controllable spectra. Alternatively, a different light source arrangement such as a DMD or LCD in combination with a high intensity lamp or high temperature blackbody source may be used. Furthermore, fiber optics or other optical means may be used to divide a one-dimensional aperture into smaller pieces and rearrange them into a small two-dimensional array of variable spectral sources. Another variation includes an output collimating element 22 outside the output aperture 20 to provide a collimated beam source. And finally, the output may be combined with that from a blackbody (not shown in FIG. 1, but see element 38 in FIG. 3) to increase source brightness and brightness adjustment precision.

An Embodiment of A Spectrally Encoded Infrared Chromatograph

Figure 2:
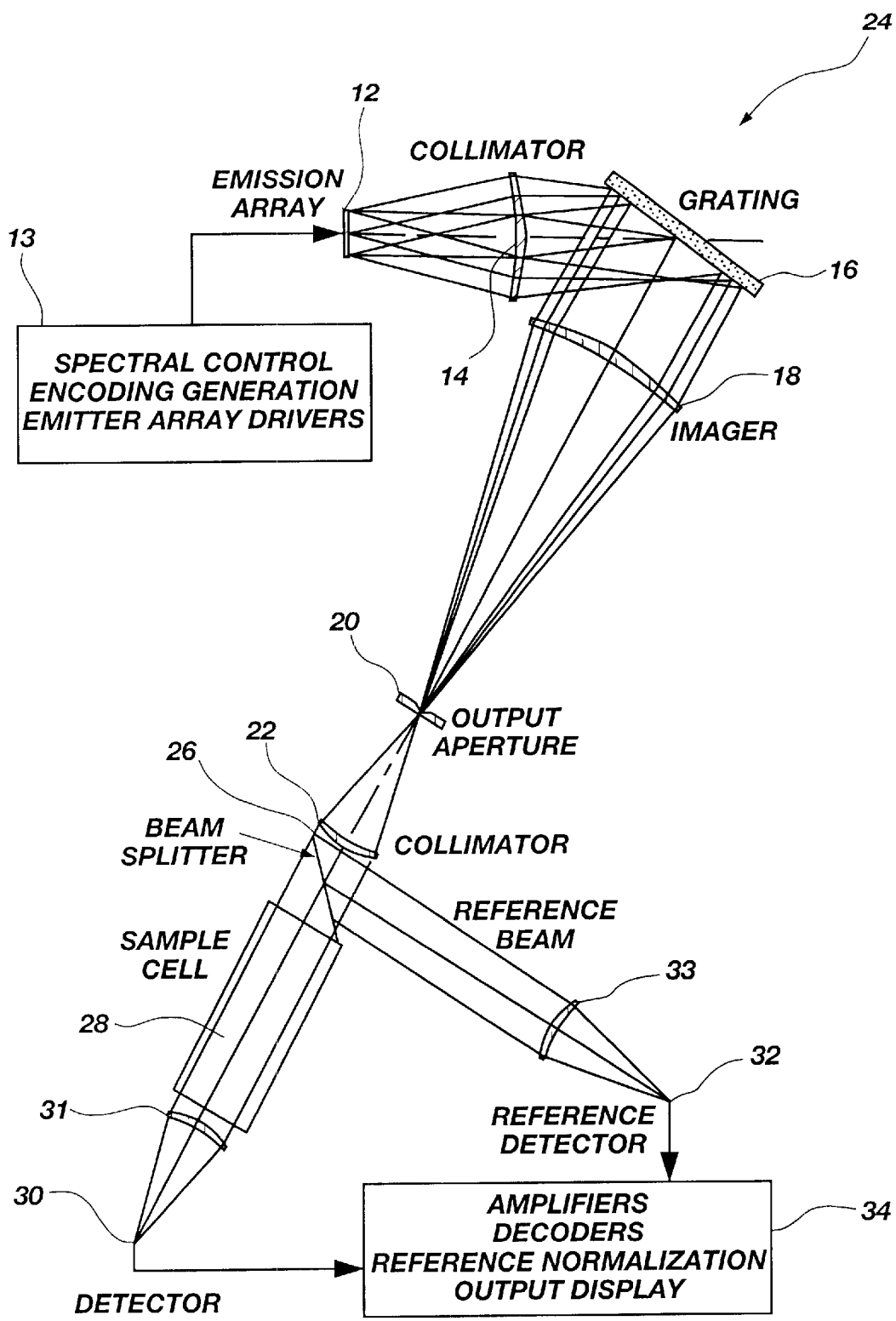
FIG. 2 is a ray trace diagram of an embodiment of a spectrally encoded infrared chromatograph in accordance with this invention.

Referring to FIG. 2, an embodiment of a spectrally encoded infrared chromatograph (SEIRC) 24 in accordance with this invention is shown. The purpose of an SEIRC 24 is to measure the infrared spectrum of a sample. The spectrum may be either in transmission through or reflection from a sample. An SEIRC 24 includes a spectrally variable radiation source 10 as described above. More specifically, an SEIRC 24 comprises a linear array of broadband infrared emitters 12, the brightness of which can be rapidly varied electronically by emitter control circuitry 13. The emitter control circuitry 13 accepts commands from a user interface (not shown) and determines which emitters (in the emitter array 12) to excite, generates the encoding waveforms and provides drive power for the emitter array 12.

The radiation from the emitter array 12 is collimated by collimating element 14, reflected off a diffraction grating 16 and refocused by an imager 18 onto an exit slit 20. The dispersion of the grating 16 selects a small wavelength band from each emitter (12A–C in FIG. 1) to pass through exit slit 20. The spatial location and size of each emitter (12A–C in FIG. 1), in conjunction with the dispersive properties of the diffraction grating 16 and the focal length of the collimating element 14, determines a unique wavelength band at the exit slit 20. Thus, modulating the brightness of a particular emitter modulates the brightness of a particular spectral component at the exit slit 20. The output at the exit slit 20 is collimated with a collimating element 22. The collimated output is then split (using a beam splitter 26) into two beams. The first beam is directed through a sample and provides a measurement signal (i.e., transmission through a sample in a sample cell 28). The measurement signal is sensed by a measurement detector 30 after being focused by a lens 31. The radiation transmitted through or reflected from the sample 28, is detected by a broadband infrared detector 30. The appropriate material for the broadband infrared detector 30 depends upon the infrared band of interest. Table 1 provides exemplary detector materials and frequency bands for which such materials respond. Table 1 is not an exhaustive list of detector materials that may be suitable for an SEIRC 24.

TABLE 1

| Detector Material | Frequency Band ($\mu$m) |
| --- | --- |
| Si | 0.4–1.1 |
| PtSi | 1–3 |
| InSb, HgCdTe | 3–5 |
| HgCdTe | 7–12 |
| As:Si | 2–20 |

The second beam provides a reference signal to allow differential absorption measurements. The reference signal is sensed by a reference detector 32 after being focused by a lens 33. Additional lenses (or powered mirrors) may be used to collimate the output for long path absorption measurements or for focusing on small test areas. The detectors (30 and 32) are coupled to circuitry 34 for signal processing and display. Circuitry 34 provides power for the detectors (30 and 32) and amplifies output from the detectors (30 and 32). Circuitry 34 then decodes the various components of the composite signal to recapture the spectral information. The reference beam amplitude is used to monitor beam intensity and improve signal to noise ratio.

There are at least two modes of operation using an SEIRC 24. A first mode of operation heats one emitter column at a time in sequence along a number of rows of emitters. This can be accomplished by creating an emitter movie file which drives one column in one frame, then the adjacent column in the next frame, etc. The result is a spectral source with its wavelength varying in time as the sequence of emitters is activated. The sequencing of the emitter excitation, whether it be linear or otherwise, may be under computer control 13. The particular output spectrum may contain all of the wavelengths that the SEIRC is capable of generating or only a portion of that range. In the first mode, the time history of the detector output translates into the spectral response of the sample 28.

A second mode of operation using an SEIRC 24, particularly applicable to process control, makes spectral measurements only at specific wavelengths chosen to identify particular components or conditions. The specific lines or bands chosen may be under computer control 13, and thus, may be easily reprogrammed and capable of being turned on statically or dynamically with arbitrary or periodic time functions. The mode of turning different wavelengths on (different columns) at different (but sequentially varying) repetition rates enables a fast, broadband detector to serve as a spectral sensor. When the detector's time dependent signal is converted to a frequency dependent signal by taking the Past Fourier Transform of the time record, the power at each frequency will correspond to the power at each emitted wavelength.

An Embodiment of An Arbitrary Spectrum Projector

An arbitrary spectrum projector 42 combines a spectrally variable radiation source (as shown in FIG. 1) with a blackbody radiation source 38 to simulate infrared emission or absorption spectra for numerous chemical and biological agents as well as project calibration and test spectra for sensor characterizations.

Figure 3:
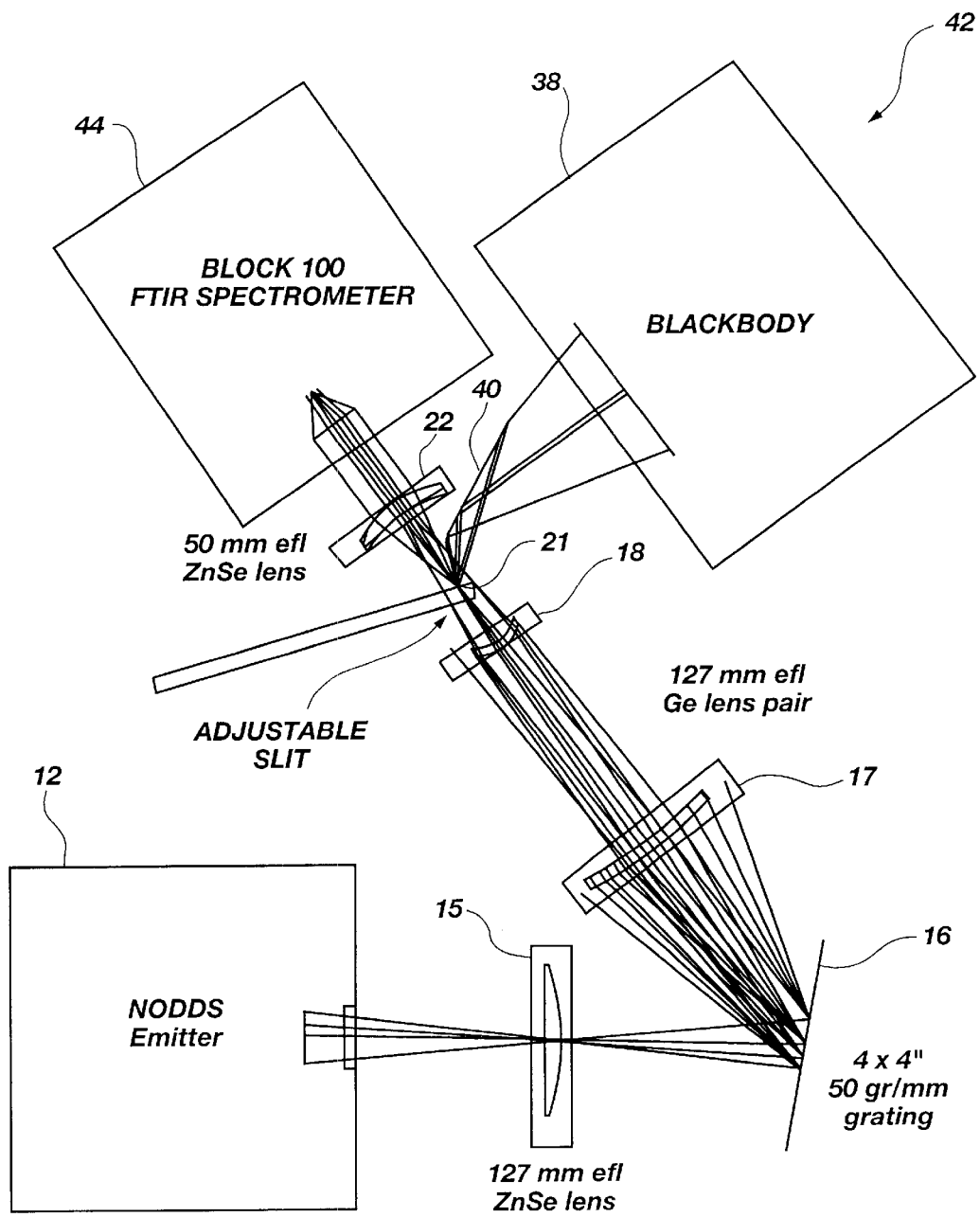
FIG. 3 is an embodiment of a long-wave infrared arbitrary spectrum projector in accordance with this invention.

Referring to FIG. 3, an embodiment of a long-wave infrared arbitrary spectrum projector 42 in accordance with this invention is shown. A NODDS emitter array 12 serves as an infrared light source 12. Broadband infrared light from the NODDS emitter array 12 is directed through lens 15 to diffraction grating 16. Light diffracted from the diffraction grating 16 is collimated by lens 17 and focused by lens 18 on an adjustable slit 21. The adjustable slit 21 may be a caliper with a reflective back side. A blackbody 38, provides a blackbody signal which is reflected off of mirror 40 and added to the light exiting the adjustable slit 21 to help simulate natural background radiance levels. The blackbody 38 preferably radiates at a temperature, T, in the range, 288 K<T<473 K. The combined output from the spectrally varying signal emerging from the adjustable slit 21 and the blackbody signal are collimated by an output collimating lens 22.

If the spatial segregation of the arbitrary and blackbody spectra is not desired, a 1:1 beam expander relay may be used, for instance, where a mixing rod of comparable height to the height of the arbitrary spectral light passing through the slit is at the focus of the first lens of the relay. The output end of the mixing rod is at the back focal distance of the second lens of the relay. All spatial segregation between the two spectral signals will be lost at the output of the approximately 5 cm-long mixing rod. Alternatively, appropriate optical fibers may be arranged in a linear array and take the place of the adjustable slit 21. Then these fibers may be combined with fibers that collect light from the blackbody 38 at the focus of the collimating lens 22. The combination of the fibers at this focus can intermix the blackbody signal with the dynamic signal by arranging the fibers in a square (or circular) array such that the dynamic and blackbody fibers are uniformly distributed.

The spectrometer 44 shown in FIG. 3 is not a required element of the arbitrary spectrum projector 42. However, such a spectrometer 44 may be used to measure and/or calibrate the output of an arbitrary spectrum projector 42. Calibration is important in producing accurate spectra. Spectrometer 44 may be an NIST-traceable spectrometer or an FIIR spectrometer. Once calibrated, a spectrometer 44 is unnecessary for operation of the arbitrary spectrum projector 42. The spectral output of the described embodiment of an arbitrary spectrum projector 42 ranges from about 7.5 to 11.5 $\mu$m and its resolution is better than 4 cm$^{-1}$ at 9 $\mu$m. The bandwidth can be expanded beyond 4 $\mu$m at the expense of resolution. The band center can easily be tuned to other wavelengths by tilting the grating.

Although this invention has been described with reference to particular embodiments, the invention is not limited to these described embodiments. Rather, it should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. An arbitrary spectrum projector comprising:
    an emitter array for producing spatially variable broadband radiation;
    a collimating element optically coupled to said emitter array for receiving said spatially variable broadband radiation and outputting collimated broadband radiation;
    a diffraction grating optically coupled to said collimating element for receiving said collimated broadband radiation and outputting diffracted broadband radiation;
    a focusing element optically coupled to said diffraction grating for receiving said diffracted broadband radiation and outputting focused broadband radiation;
    an adjustable slit optically coupled to said focusing element for receiving and passing a portion of said focused broadband radiation;
    a blackbody optically coupled to the output of said adjustable slit for producing and adding background radiation to said portion of said focused broadband radiation producing arbitrary spectral emissions; and
    an output collimating element for receiving and collimating said arbitrary spectral emissions.

2. The arbitrary spectrum projector of claim 1, wherein said emitter array is an infrared emitter array including at least 512×512 dynamically driven and individually computer controlled resistors.

3. The arbitrary spectrum projector of claim 1, wherein said adjustable slit is a caliper with a reflective back side.

4. The arbitrary spectrum projector of claim 1, wherein said adjustable slit is a linear array of optical fibers.

5. The arbitrary spectrum projector of claim 1, wherein said blackbody radiates infrared radiation at temperature, T.

6. The arbitrary spectrum projector of claim 5, wherein said temperature, T ranges from about 288 K to about 473 K.

7. The arbitrary spectrum projector of claim 1, further including a spectrometer for calibrating the output of said arbitrary spectrum projector.

* * * * *